April 14, 1931.                L. D. KAY                1,800,734
                              TRUCK WHEEL
                           Filed May 14, 1927

Inventor
Lloyd D. Kay
By Lyon & Lyon
Attorneys

Patented Apr. 14, 1931

1,800,734

UNITED STATES PATENT OFFICE

LLOYD D. KAY, OF LOS ANGELES, CALIFORNIA

TRUCK WHEEL

Application filed May 14, 1927. Serial No. 191,302.

This invention relates to truck wheels. It has been customary to secure tire rims to truck wheels by providing an inboard seat with a wedge ring and an outboard seat with a wedge ring. This entails the use of a considerable number of studs and bolts in connection with each wedge ring for securing the same in place. The inboard studs are not readily accessible. The general object of this invention is to provide a truck wheel in which the tire rim is secured upon an outboard seat, readily accessible from the outboard side of the wheel, and to provide a construction whereby the rim will have a certain bearing or seat near the inboard side of the wheel without necessitating the provision of any fastening means or a wedge ring at that point.

One of the objects attained by the invention is that the wheel rim is given considerable resiliency by reason of the overhang of the wheel rim beyond the seat to which it is affixed.

It frequently happens that an automobile owner will substitute oversize, or balloon tires, for standard tires, and the substituted tires may be so large as to interfere with the free movement of the wheels in steering. A further object of the invention is to provide a construction which will enable such requirements to be met and which will enable the position of the tire, with respect to the plane of the wheel, to be altered at will.

Further objects of the invention will appear hereinafter.

The invention consists of the novel parts and combination of parts to be described hereinafter, all of which contribute to produce an efficient truck wheel.

A preferred embodiment of the invention is described in the following specification, while the broad scope of the invention is pointed out in the appended claims.

Figure 1:
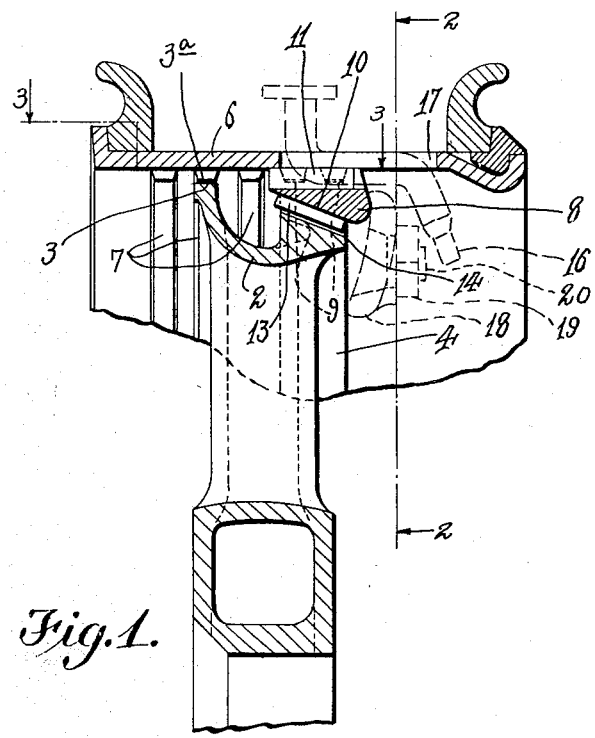
Figure 1 is a vertical section through a wheel embodying my invention, the lower portion of the wheel being broken away.

In practicing the invention, I provide a wheel of any suitable construction. This wheel is preferably constructed so that it can be readily made of cast steel. It is formed with a felloe 2 of shallow-dish form, that is to say, of concavo-convex form, and presents an inboard seat 3 at its inner edge and an outboard seat 4 at its outer edge. The outboard seat 4 presents a substantially conical seat face 5.

The wheel carries a tire rim 6 which is in the form of a steel ring of substantially cylindrical shape. This rim 6 is provided on its inner face with a plurality of projections 7, preferably in the form of circumferential ribs.

Figure 3:
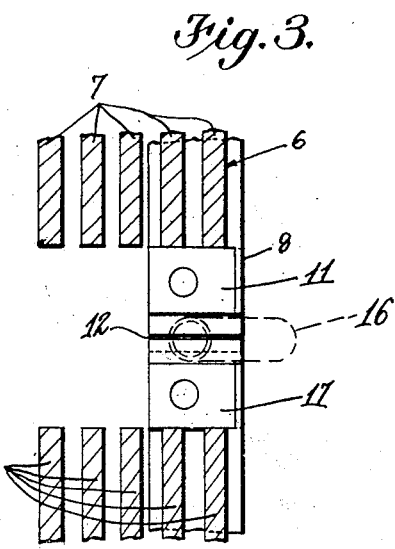
Figure 3 is a sectional plan taken about on the line 3—3 of Figure 1.
Figure 4:
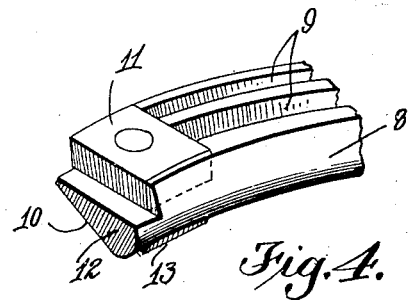
Figure 4 is a perspective showing one end of the locking ring which constitutes a feature of the invention.

In order to secure the rim on the wheel, I provide a locking ring 8 which is preferably in the form of a split ring having a plurality of grooves 9 on its outer face to receive the projections or ribs 7. These grooves are of the same width and cross section. This locking ring is substantially wedge-shaped in cross-section; that is to say, it presents a substantially conical inner face 10 to come upon the conical seat face 5. In order to prevent relative circumferential movement of the rim 6 on the locking ring, I provide suitable interlocking means between these parts. In the present instance, for this purpose, I provide a block 11 which is riveted near the split 12 of the locking ring 8. This block abuts against the end of the ribs 7 (see Figure 3) and this will prevent the relative rotation referred to.

Any suitable means may be provided for driving the rim with the wheel. For this purpose I provide interlocking means between these parts, and this is accomplished by providing a lug or block 13 on the inner side of the ring 8 which is received in a recess 14 formed in the conical seat 5.

The locking ring is preferably in the form of a split ring, as suggested, and each end is provided with one of the blocks 11 and one of the blocks 13 which operate as lugs to engage, respectively, with the ends of the ribs and with the shoulders 15 at the ends of the recess 14.

The inflating nipple 16 for inflating the tire is of bent form, as indicated in the dotted outline in Figure 1. In other words, it has a horizontal extension which lies in a slot 17 formed in the tire rim and the lower portion of this extension lies in the space 17 between the two blocks 11 (see Figure 2).

The inboard seat 3 on the felloe lies very close to the inner face of the tire rim 6. I prefer to use a sufficient number of the ribs 7 so that one of these ribs will lie opposite to and very close to the seat 3 (see Figure 2).

When the rim is being placed on the wheel, the split ring 8 will first be applied to the inner face of the rim, and the rim, with the locking ring attached to it, will then be slid over the body of the wheel, taking care to align the lugs or blocks 13 with the recess 14. The locking ring is then secured in place by means of the usual, removable lugs 18 secured by nuts 19 attached to the usual studs 20, mounted on the wheel body. When these nuts are tightened up, the locking ring will be forced onto its seat 5 and expanded by the seat against the inner face of the tire rim 6.

A wheel having these features of construction will evidently provide a very secure attachment between the rim and the wheel. At the same time, I prefer to provide a narrow gap $3^a$ between the seat 3 and the adjacent rib 7. This will permit a certain amount of movement of the rim, but after this movement has taken place, a seat is provided for the rim. In other words, the construction permits a certain amount of play of the rim in the vicinity of the seat 3, but after this play has taken place, the rim will come solidly against the felloe of the wheel.

In addition to this, the use of the ribs on the inner side of the rim 6 enables the position of the rim to be readily adjusted to regulate the position of the middle plane of the rim and tire with respect to the middle plane of the wheel. In the present instance, as illustrated, the grooves 9 in the outer face of the locking ring engage the two most outboard ribs 7. If it were desired to attach the rim with more outboard overhang, it would simply be necessary to remove the split ring 8 and secure it to the second and third ribs 7 instead of to the first and second ones. This would give the rim more outboard overhang and would align the last rib at the left with the inboard seat 3.

Figure 2:
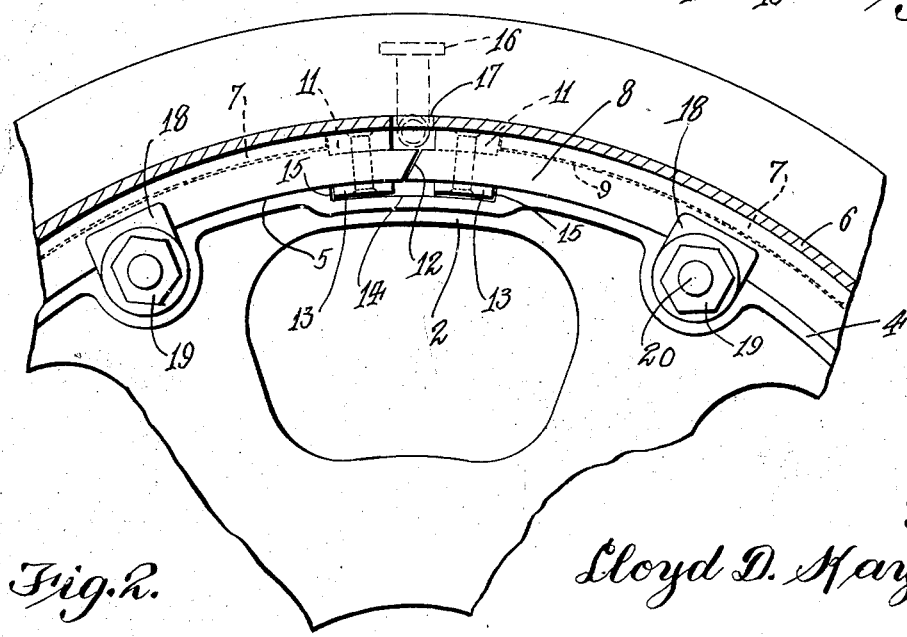
Figure 2 is a section taken about on the line 2—2 of Figure 1, the body of the wheel being broken away.

Referring to Figure 2, the split, or gap, 12, between the ends of the split ring is preferably inclined. This facilitates the attachment and detachment of the split ring from the wheel rim 6. In order to detach the locking ring it is merely necessary to pull the right hand end of the ring inwardly toward the axis of the wheel. In this way the ring can be contracted so as to enable it to be completely disengaged from the rim. An opposite procedure is employed to place the split ring within the rim 6.

One of the advantages arising from the use of the ribs 7, is that they can readily be formed by rolling the wall of the rim, and their stiffening effect enables the thickness of the metal of the rim to be reduced, thereby enabling the weight of the rim to be reduced.

It is understood that the embodiment of the invention described herein is only one of the many embodiments this invention may take, and I do not wish to be limited in the practice of the invention, nor in the claims, to the particular embodiment set forth.

I claim:

1. In a truck wheel, the combination of a wheel having a felloe with an inboard rim seat and an outboard rim seat, said outboard rim seat having a substantially conical face, a tire rim consisting of a ring with ribs on its inner face, a locking ring in the form of a split ring having a lug on its inner face, said seat having a recess for receiving the lug and operating to prevent circumferential movement of the locking ring on the wheel, said locking ring having grooves on its outer face to receive the said ribs and means on the wheel for clamping the locking ring on the conical seat.

2. In a truck wheel, the combination of a wheel having a felloe with a tire rim seat having a substantially conical face, a tire rim in the form of a ring having a plurality of circumferential ribs on its inner face, a locking ring in the form of a split ring having grooves on its outer face for receiving the said ribs, and having a lug for engaging the ends of the ribs to prevent relative circumferential movement of the rim on the ring, said ring having a substantially conical inner face to come upon the seat and having a lug on its inner face, said seat having a recess to receive the last named lug, operating to prevent relative circumferential movement of the locking ring on the wheel, and means for clamping the locking ring on the seat.

3. In a truck wheel construction, the combination of a wheel having a felloe, a tire-rim consisting of a ring with a plurality of circumferential ribs on its inner face, said ribs being displaced laterally from each other on the rim, a split spring-ring capable of detachably engaging with the different ribs to hold the rim in a plurality of different lateral positions with relation to the split spring-ring, and means for securing the spring-ring to the said felloe in a relatively fixed position.

4. In a truck wheel construction, the combination of a wheel having a felloe with an inboard seat and an outboard seat, a tire-rim consisting of a ring with a plurality of circumferential ribs on its inner face, a split spring-ring, detachably engaging the inner face of the rim, having means on its outer side for interlocking with the said ribs, and capable of interlocking with the said ribs in a plurality of different laterally shifted positions, the said inboard seat being in alignment with one of the said ribs and lying adjacent to one of said ribs in all the said different laterally shifted positions of said tire rim.

5. In a truck wheel construction, the combination of a wheel having a felloe with a substantially conical outboard rim seat, a tire-rim consisting of a ring with circumferential projections on its inner face located in different planes at right angles to the axis of the wheel, a split spring-ring detachably engaging the inner face of the tire-rim having means on its outer side for engaging the sides of the projections and capable of engaging the said projections in a plurality of different laterally displaced positions on the rim, said spring-ring having a conical face to seat upon the conical face of the outboard seat.

6. In a truck wheel construction, the combination of a wheel having a felloe with a rim seat having a substantially conical face, a tire rim consisting of a plurality of circumferential ribs, said ribs being laterally displaced from each other on the rim, a split spring-ring detachably engaging the inner face of the tire-rim and having a plurality of grooves on its outer face to receive the said ribs of the rim and capable of enaging the different ribs in different laterally displaced positions on the tire rim, said ring having a substantially conical inner face seating upon the said conical face of the felloe, and means on the wheel for forcing the said spring-ring onto the seat and expanding the same against the inner face of the rim.

7. In a truck wheel construction, the combination of a tire-rim, a split spring-ring detachably engaging the inner face of the tire-rim, said spring-ring and said tire-rim having interlocking means capable of interlocking with the spring-ring in a plurality of different laterally displaced positions on the tire-rim, and means for securing the split ring to the wheel felloe.

8. A ring to be used in a truck wheel construction consisting of a split spring-ring having a plurality of circumferential grooves on its outer face, and having a substantially conical seat face on its inner side, said grooves being of the same width and cross section to cooperate with a tire rim with corresponding grooves, as and for the purpose set forth.

9. In a truck wheel, the combination of a wheel having a felloe with an inboard rim seat and an outboard rim seat, said outboard rim seat having a substantially conical face, a tire rim consisting of a ring with ribs on its inner face, a locking ring removably mounted within the tire rim having a lug on its inner face, said seat having a recess for receiving the lug and operating to prevent circumferential movement of the locking ring on the wheel, said locking ring having grooves on its outer face to receive the said ribs, and means on the wheel for clamping the locking ring on the conical seat.

10. In a truck wheel, the combination of a wheel having a felloe with a tire rim seat having a substantially conical face, a tire rim in the form of a ring having a plurality of circumferential ribs on its inner face, a locking ring removably mounted on the inner side of the tire rim having grooves on its outer face for receiving the said ribs, and having a lug for engaging the ends of the ribs to prevent relative circumferential movement of the rim on the ring, said ring having a substantially conical inner face to come upon the seat and having a lug on its inner face, said seat having a recess to receive the last named lug, operating to prevent relative circumferential movement of the locking ring on the wheel, and means for clamping the locking ring on the seat.

11. In a truck wheel construction, the combination of a wheel having a felloe with an inboard rim seat and an outboard rim seat, said outboard rim seat having a substantially conical face, a tire rim consisting of a ring with ribs on its inner face, and mounted so that one of said ribs is in alignment with said inboard rim seat, a locking ring in the form of a split ring having a lug on its inner face, said seat having a recess for receiving the lug and operating to prevent circumferential movement of the locking ring on the wheel, said locking ring having grooves on its outer face to receive the said ribs, and means on the wheel for clamping the locking ring on the conical seat.

Signed at Los Angeles, California this 5th day of May, 1927.

LLOYD D. KAY.